March 16, 1965  R. VALVERDE  3,174,014
CONTROL BY WHICH SENTINEL THERMOSTAT INSURES CONTACT
OPENING OF CONTROL THERMOSTAT
Filed Oct. 12, 1961
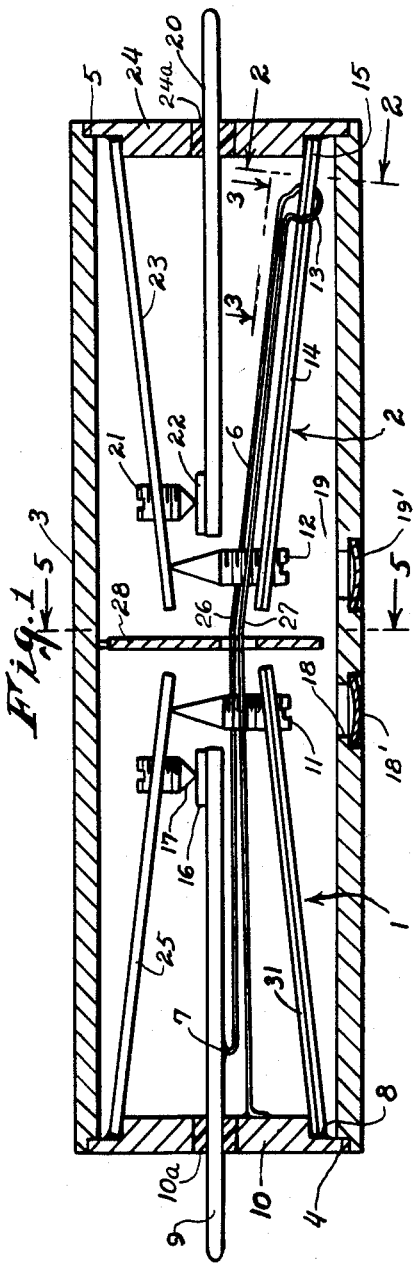
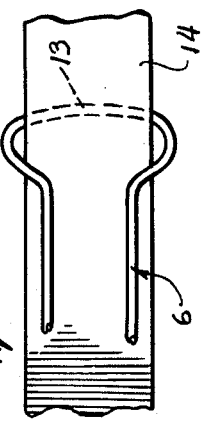
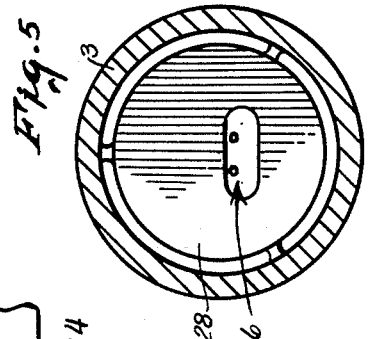
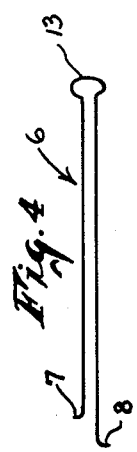
INVENTOR.
Robert Valverde
BY Emery, Whittemore
Sanders & Graham
ATTORNEYS

United States Patent Office 3,174,014
Patented Mar. 16, 1965

3,174,014
CONTROL BY WHICH SENTINEL THERMOSTAT INSURES CONTACT OPENING OF CONTROL THERMOSTAT
Robert Valverde, 865 1st Ave., New York, N.Y.
Filed Oct. 12, 1961, Ser. No. 144,739
6 Claims. (Cl. 200—122)

This invention relates to heat-responsive electric switching apparatus, and more especially to an improved combination of thermostats with provision for preventing over-heating.

It is an object of the invention to provide an improved electric circuit controller with contacts that operate in response to change of temperature and with apparatus for preventing the contacts from welding or sticking together.

The invention includes snap-action switching means and it has a dual thermostatic control by which a second thermostat controls the application of force to compel the operation of a first thermostat if the contacts of the latter stick and fail to open at the intended temperature.

Another object of the invention is to provide a construction of the character indicated with the parts so correlated that they can be constructed in miniature size and assembled into a small tube into which they are sealed to obtain a miniature, unitary controller.

Other objects, features and advantages of the invention will appear or be pointed out as the description proceeds.

In the drawing, forming a part hereof, in which like reference characters indicate corresponding parts in all the views:

FIGURE 1 is a diagrammatic sectional view showing a heat-responsive controller constructed in accordance with this invention;

FIGURES 2 and 3 are sectional views taken on the lines 2—2 and 3—3, respectively, of FIGURE 1;

FIGURE 4 is a fragmentary view of the heater wire shown in the combination of FIGURE 1; and FIGURE 5 is a sectional view on the line 5—5 of FIGURE 1.

This invention is an improvement on the apparatus shown in my Patent No. 2,747,054.

FIGURE 1 shows a thermostat assembly including a sentinel thermostat 1 and a control thermostat 2 with contacts which are closed when the thermostats are at temperatures not in excess of the operating temperature for which the thermostats are adjusted. These thermostats 1 and 2 are disposed in end-to-end relation in a housing which includes a tube 3 having counterbored ends 4 and 5. The tube 3 is preferably made of brass.

A heater wire loop 6 has its ends 7 and 8 attached to a header pin 9 of the sentinel thermostat 1 and to a base or header body 10, respectively. The header pin 9 is supported by the header body 10 and is insulated from the body 10 by glass insulation 10a.

The thermostats 1 and 2 have temperature-adjusting screws 11 and 12, and the wire loop 6 is shaped so as to pass the temperature-adjusting screws 11 and 12 without touching them. The wire loop 6 has a closed end portion 13 which on assembly slides along a bimetal strip 14 of the thermostat 2, and the wire loop 6 reaches nearly to a fixed end 15 of the thermostat 2. This prevents the wire loop from being bent out of place and permits the thermostats to be assembled more conveniently into the tube 3.

The wire loop 6 is enameled to prevent grounding on the bimetal strip 14. It is short-circuited by contacts 16 and 17 of the thermostat 1.

The tube 3 has counterbored openings 18 and 19 through which a screwdriver can be inserted for moving the temperature-adjusting screws 11 and 12. These openings 18 and 19 are preferably closed by discs 18' and 19' soldered into the counterbored opening 18 and 19.

The thermostat 2 has a header pin 20 and has contacts 21 and 22 which correspond to the contacts 16 and 17 of the thermostat 1. Header pin 20 is supported by a header body 24 and is insulated from the body 24 by glass insulator 24a. As in the case of the thermostat 1, the contact 22 is secured to the header pin 20, and the movable contact 21 is carried by a contact strip 23 attached at one end to the base or header body 24 welded to this body 24 with the strip extending toward the midportion of the tube 3. In the thermostat 1, the contact 17 is carried by a contact strip 25, which is secured to the header body 10.

The circuit of the structure shown in FIGURE 1 starts at the header pin 20 and passes through the fixed contact 22, movable contact 21, contact strip 23, header body 24, tube 3, header body 10, contact strip 25, movable contact 17, and through the contact 16 to the other header pin 9.

The contacts 16 and 17 are closed at a temperature above the intended operating temperature of the combined thermostat by backing the screw 11 away from the contact strip 25 until there is some clearance between the screw 11 and the contact strip 25. This adjusting screw 11, which operates the sentinel thermostat 1, is carried by a bimetal strip 31 which serves as the thermal motor of the thermostat 1. It corresponds to the bimetal strip 14 of the thermostat 2. At their fixed ends, the bimetal strips 31 and 14 are secured to the header bodies 10 and 24, respectively. The adjusting screw 12 on the control thermostat 2 is adjusted with the apparatus in an oven to obtain operation of the thermostat at an intended temperature. The adjusting screw 11 is set so that it just fails to open the contacts 16 and 17 at the intended operating temperature of the control apparatus.

When the invention is in operation, and the contacts 21 and 22 fail to open at the intended temperature, a further increase in temperature causes the thermostat 1 to open the contacts 16 and 17. This opening of the circuit in the sentinel thermostat 1 causes the full electrical load of the thermostat to be imposed on the heater wire loop 6. The wire loop 6 is supported by the thermostat 1 and the portion of the loop adjacent to the thermostat 1 is made of low resistance wire. This low resistance portion of the loop 6 is welded or otherwise connected at 26 and 27 with a high resistance portion of loop 6 adjacent to the bimetal strip 14 of thermostat 2. This portion of the loop with the high resistance becomes heated and heats the bimetal strip 14. This increases the force exerted by the bimetal strip 14 and causes it to force the contacts 21 and 22 apart.

This opening of the contacts 21 and 22 of the thermostat 2 breaks the electrical circuit, and as the temperature of the atmosphere around the thermostat decreases, the contacts 16 and 17 of thermostat 1 close first, and then the contacts 21 and 22 of thermostat 2 come together and resume their control. A partition 28 of heat insulating material separates the portions of the housing or tube 3 in which the different thermostats are located.

The heat-responsive controller of this invention is intended primarily for use in ovens for crystals or other electronic apparatus which must be kept at uniform temperatures. The construction is one which can be made in extremely small sizes, the drawing being many times larger than the actual construction of commercial control apparatus made in accordance with this invention. It will be understood, however, that the invention is applicable to thermostats of larger size and to the control of temperatures in other environments.

The header bodies 10 and 24 are preferably soldered or otherwise bonded to the sides of the counterbored ends 4 and 5 at the opposite ends of the tube 3; but force fits can be used. It is another advantage of the invention, however, that the housing can be hermetically sealed to minimize contact fouling. Another advantage is the bimetal is thermally a part of the tube, enabling a quick response to temperature changes.

The snap action of the thermostats 1 and 2 results from the difference in the friction between stationary and relatively moving parts. The ends of the screws 11 and 12 move along the length of the strips 25 and 23, respectively, as the screws 11 and 12 displace these contact strips. Since static friction is higher than moving friction, a stress builds up between each adjusting screw and its associated contact strip until the component of force tending to slide the screw along the contact strip becomes greater than the static friction. The screw 11 or 12 then slips along its contact strip 25 or 23 and continues to move because of the reduced friction which obtains once movement has started. If the stress in the bimetal is relieved, the movement of the screw along the contact strip stops and is not resumed until the stress of the bimetal builds up sufficiently to again overcome the static friction. This means the contact pressure is positive up to the instant when motion begins.

The preferred embodiments of the invention have been illustrated and described, but changes and modifications can be made and some features can be used in different combinations without departing from the invention as defined in the claims.

What is claimed is:

1. A heat-responsive controller including a control thermostat mounted on a base, a sentinel thermostat secured to a second base, a tubular housing with openings at its opposite ends, the different thermostats being inserted into the openings at opposite ends of the housing and having their bases connected to the housing, each of the thermostats having two contacts that move into and out of contact with one another to control a circuit through the thermostat, a terminal on each of the thermostats electrically insulated from the housing, each of the terminals connecting with one of the contacts of its thermostat, at least a portion of the wall of the housing being metal, and the other contacts of each of the thermostats being electrically connected with the metal of the housing and connected in series with one another through the metal of the housing.

2. The heat-responsive controller described in claim 1 and in which the housing is a miniature metal tube, and the two thermostats are inserted into the metal tube from opposite ends, and the bases of the miniature thermostats form covers which close the ends of the tube.

3. The heat-responsive controller described in claim 2 and in which each of the thermostats is a complete, assembled unit on its base and there is a counterbore in each end of the tube, and the base of each thermostat fits into the counterbore at a different end of the tube, and there is an electrical heating element in the housing adjacent to one of the thermostats and controlled by the other thermostat, and a partition in the tube between the spaces in which the different thermostats are located.

4. The heat-responsive controller described in claim 3 and in which the base of each thermostat is bonded to the tube and hermetically seals the end of the tube.

5. A thermostat assembly including a control thermostat and a sentinel thermostat, each of the thermostats having two contacts, and the contacts of the different thermostats being in series with one another, the sentinel thermostat being set a few degrees above the control thermostat, a sealed tube in which both of the thermostats are mounted, and a partition of heat insulating material separating the sentinel thermostat space from the control thermostat space.

6. A thermostat assembly including a control thermostat and a sentinel thermostat, each of the thermostats having two contacts, and the contacts of the different thermostats being in series with one another, an electric heating element on the control thermostat and only the control thermostat, the heating element being electrically connected across the sentinel thermostat contacts by low-resistance leads.

References Cited by the Examiner

UNITED STATES PATENTS 2,302,924    11/42    Valverde    200—122
2,747,054    5/56    Valverde    200—138

BERNARD A. GILHEANY, *Primary Examiner.*